July 25, 1950  B. ALTMAN ET AL  2,516,501
THERMOSTATIC ELECTRICAL SWITCH
Filed Sept. 27, 1947  3 Sheets-Sheet 1
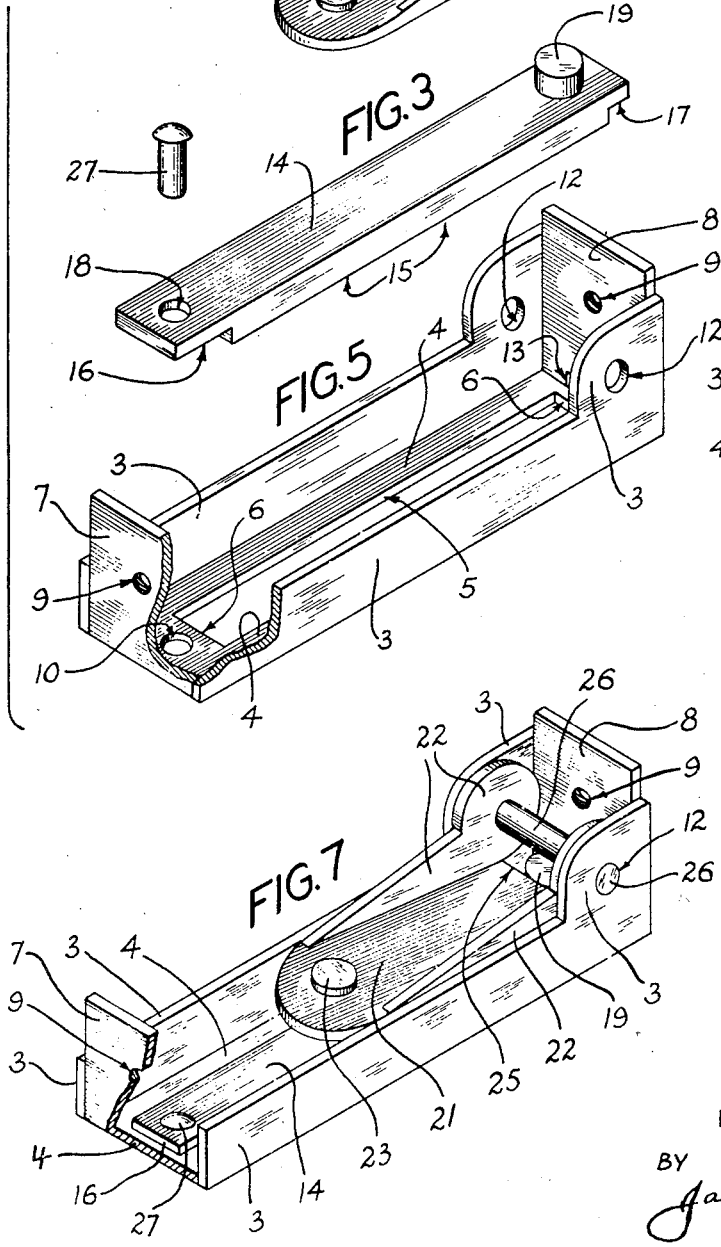
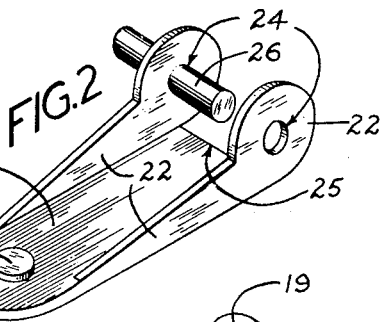
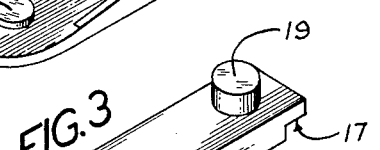
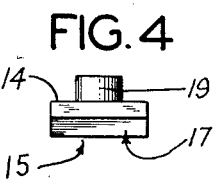
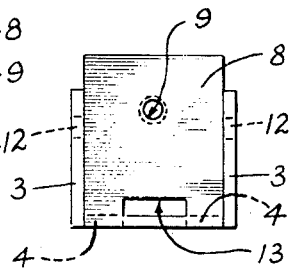
INVENTORS.
BERNARD ALTMAN
PAUL STILLER
BY James C. Ledbetter
ATTORNEY.

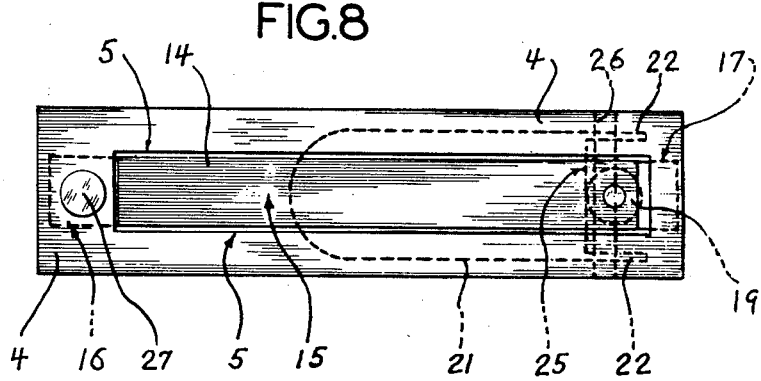
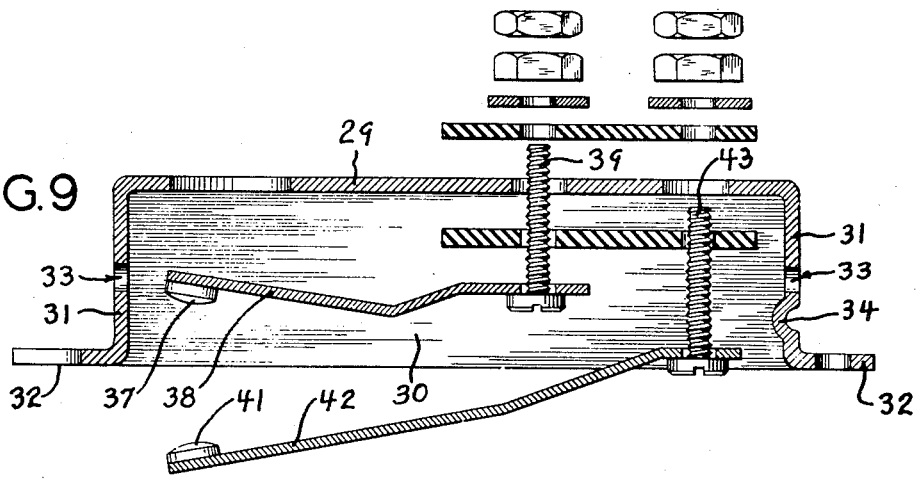
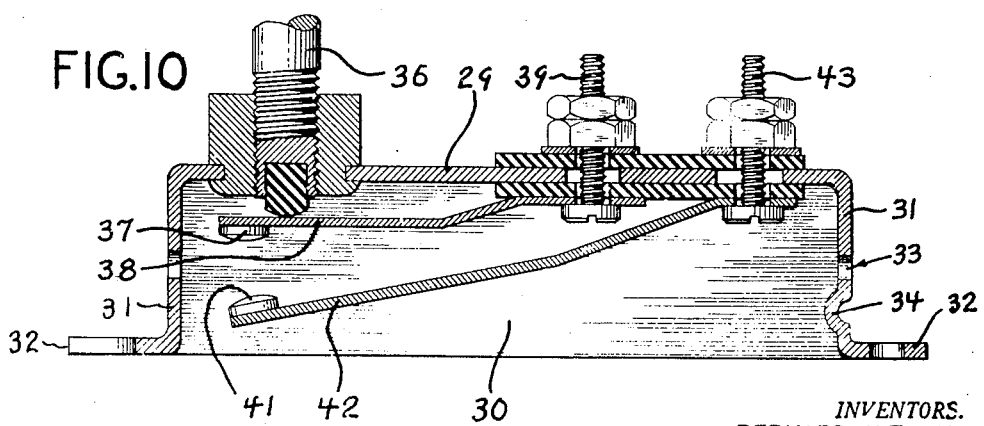

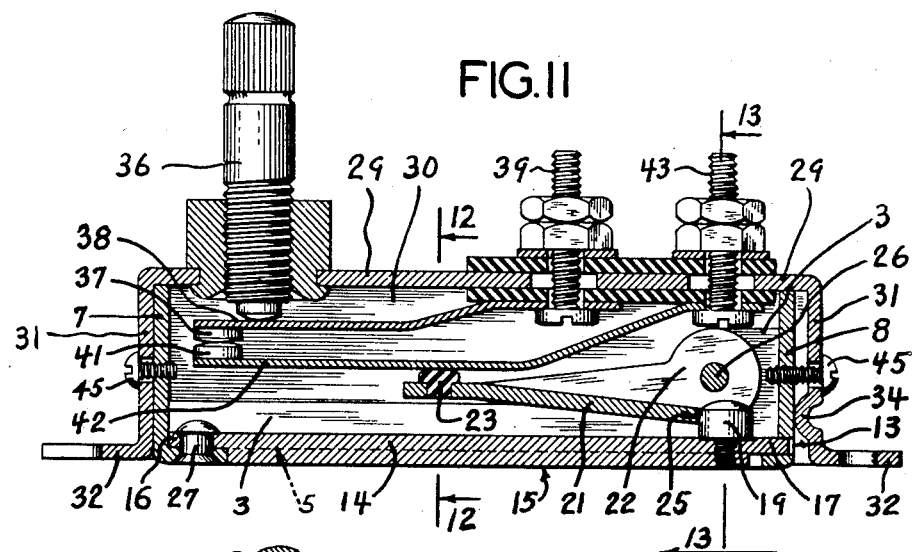
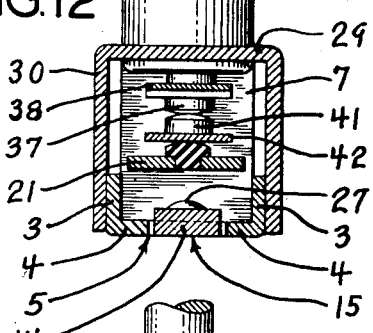
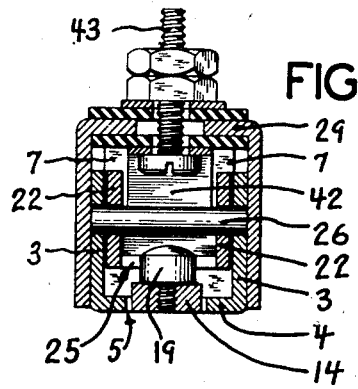
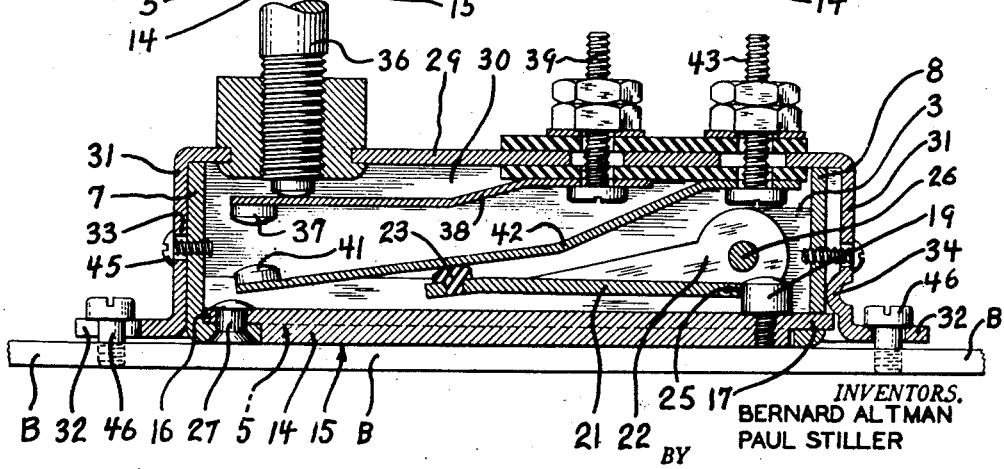

Patented July 25, 1950

2,516,501

UNITED STATES PATENT OFFICE 2,516,501

THERMOSTATIC ELECTRICAL SWITCH

Bernard Altman, Larchmont, and Paul Stiller, Mount Vernon, N. Y., assignors to Manrein Corp., New York, N. Y., a corporation of New York Application September 27, 1947, Serial No. 776,590

9 Claims. (Cl. 200—137)

This invention relates to a new thermostatic electrical switch for automatically maintaining substantially constant or uniform temperatures in electrically-heated apparatus, as for example, by controlling the flow of current to sadirons, furnaces, appliances, and all manner of industrial and domestic electrical heaters, as well as for operating electrical relays and the like used for various purposes.

This thermostatic switch includes a one-piece metallic member, having a higher coefficient of expansion than other metallic parts of the switch assembly, which elongates when heated and shortens when cooled (as is known in the art), thereby producing an appreciable amount of straight or rectilinear movement adapted to be utilized automatically for opening and closing electrical-switch contact points and controlling the transmission of current for maintaining temperature at a preselected constant value in accordance with a manual adjustment or setting of the thermostatic switch.

The particular type of thermostatic switch herein disclosed embodies a single metallic bar, which is thermally responsive (by linear expansion and contraction) to temperature variations, for producing the above-stated appreciable motion required to open and close its contact points. We sometimes refer to this form of switch as a "monometal" or a "monobar" (also known as "unimetal") type inasmuch as its active or thermal-responsive member comprises a single bar of like metallic constituency or formula throughout its mass.

Accordingly, the "monobar" type switch herein is distinguished from a "bimetal" thermal-responsive member which comprises a lamination of two metals (of unlike metallic constituency) having dissimilar coefficients of expansion and which produces an angular motion, such as a bowing or flexing action. In other words, the "monometal" thermostatic member can be made to act with a straight-line movement, while the "bimetal" thermostatic member always acts with an angular or flexing movement, both types being known in the art.

The new form of "monobar" thermostat herein, with its characteristic straight-line or linear mechanical expansion and contraction (having complete freedom from all tendency to produce an angular motion when designed and constructed with that purpose in view), possesses a distinct advantage, in that it remains in constant engagement, that is, constant "thermal contact" throughout its range of movement, with the heating appliance on which it is installed and with which it has a temperature-exchange function. A straight-line or linear-acting thermal-responsive bar, therefore, possesses maximum thermal conductivity.

By reason of the foregoing "constant-thermal engagement" characteristic, we also at times refer to the new "monobar" form of thermostatic switch herein as a conduction or a "solid-contact" type because, as above stated, it can be installed with flat and continuously-engaging surface-area thermal-contact with the base or other part of an appliance with which it has a temperature-exchange relation. Although the above-discussed types are known to the art, the "monobar solid-contact" species of thermostatic switches which have come to our attention do not appear to fully utilize the advantages of the simple principles on which they operate with certain advantages over other types of thermostats.

Certain of the more important and apparent advantages of the monobar solid-contact thermostatic switches inhere in their surface-area thermal-contact with the heating member of an appliance on which they are installed for controlling the temperature of such appliance. Maximum surface-area contact continuously exists throughout the range of temperature variations. Accordingly, such type of switch possesses the advantage of operating (expanding and contracting) primarily by heat conduction, that is, by direct contact for temperature exchange. This mode of operation (conduction) provides a "fast" thermostatic switch because of its maximum sensitivity to the variations in degree of temperature of the appliance or apparatus which it controls.

In other words, it will be seen that the "solid-contact" type of thermal-responsive member (achieved by the straight-line motion of a monobar) possesses a faster temperature exchange than an angular-motion type of thermostat, such as the bimetal type which operates more generally by convection and radiation for its temperature-exchange, due to its action of flexing or bowing away from the heating part of an appliance on which it is installed.

Also, it is instructive to note that in mass production, the dimension tolerances of the "monobar" are less critical than the "bimetal" bar. In other words, the coefficient of expansion and hence the linear movement is the same for each monobar in a manufactured lot or mass quantity of given size, whereas such coefficient and hence the angular movement may vary an appreciable amount in a given lot of the same size bimetal bars. The latter condition (lack of uniformity) arises in respect to the bimetal type due to the variation of tolerances which may occur in the manufacture of the thin sheets or strips which are laminated and bonded together to form bimetal members.

Furthermore, corrosion is a minor factor in the "monobar" member, whereas with the "bimetal" member, each lamination of which is of thin cross section, it is obvious that even slight corrosion acts to diminish to a substantial percent the original thin cross section of one or both laminations with the result that the originally-calibrated coefficient of expansion, and hence the intended degree of angular movement, is lost.

Finally, and among other advantages known in the art, a further study of the subject will reveal that the "monobar" is not a current-carrying part, whereas the "bimetal" bar may be and often is a current-carrying part because included as a conductor in the electrical circuit with the switch.

Repeated flexing of a "bimetal" member eventually fatigues it which means loss of its original calibration. In contrast thereto, a "monobar" member undergoes linear movement and is not susceptible to fatigue, thus maintaining the original-temperature calibration of the manufacturer and providing for uniformity in quantities of thermostats produced.

With the foregoing in mind, it is a general purpose of this invention to produce a new form of "monobar solid-contact" thermostatic electrical switch which more fully utilizes the principles of this known type, thereby providing a more sensitive and faster-operating switch—one which retains in service its original-temperature calibration—for the benefit of the trade, especially the electric sadiron manufacturers and others requiring fast and efficient thermostats which readily may be installed in temperature-exchange relation on electrically-heated and relay-controlled equipment.

A further purpose is to produce a new thermostatic switch of the "monobar or unimetal solid-contact" type, which has a minimum number of parts arranged in simplified units of sub-assemblies—and which readily attain final assembly—to form a new structural combination of improved manufacture, and lending itself to simple production methods.

Another purpose is to produce a thermostatic electrical switch, the parts of which initially are grouped in two separately-complete sub-housing assemblies, with the electrical contact make-and-break means mounted within one housing part, while the monobar and its motion-amplifying and transmitting means are mounted within another housing part, the simple joinder of the two housing parts of which results in a final assembly and which completely combines and encloses all parts in precise working alignment without the necessity of applying undue time and skill when making the final assembly.

The drawings

This description and the accompanying drawings explain the principle of the invention, point out its main purposes and utility, present it as preferred at this time, demonstrate its features in order to disclose the scope of the invention, thus suggesting further examples which may develop out of the teachings herein, or which may occur to others who wish to avail themselves of the benefits of the invention, and also aid in understanding the problems sought to be solved.

Concerning the assembly arrangement as shown in the drawings: Figs. 1 through 8 show the development of what we refer to as the first sub-assembly comprising a "housing-base unit"; while Figs. 9 and 10 show the second sub-assembly comprising a "housing-cover unit"; and Figs. 11 through 14 show the two sub-units comprising channel-like housing parts telescoped in "final assembly."

Fig. 1 is presented as a group-view, in perspective, of a new form of thermal-responsive "monobar," with its motion-amplifying and transmitting parts, and a housing base. Likewise, a shaft and rivet are shown for use in assembling the housing-base unit. These five parts (Fig. 1) are placed in separated or spaced alignment for sub-assembly of the "housing-base unit" illustrated in Figs. 7 and 8.

Fig. 2 shows a new form of lever, in the form of a bell crank, and its mounting shaft (hence two parts), adapted to be assembled in a "housing-base" (Fig. 5) for amplifying and transmitting the thermally-induced movement of a monobar to the electrical switch-contact means (hereinafter shown) for controlling the make-and-break action of the switch.

Fig. 3 shows a new form of thermal-responsive monobar (as for example, brass) having a greater coefficient of expansion than the supporting parts (for example, iron or steel) of the automatic switch. This one-piece (unimetal) bar is adapted to be mounted in the housing base (Fig. 5) by the rivet shown in Fig. 3—thus two parts in this view.

Fig. 4 shows an end view of the "active" or movable end of the monobar, that is, the right-hand end thereof in Fig. 3.

Fig. 5 is a perspective of the above-named "housing-base" in which the motion-amplifying lever and the monobar (Figs. 2 and 3) are to be operatively mounted, as later described. The near corner of the housing-base is broken away to show its near-end construction.

Fig. 6 shows an end view of the housing-base, that is, the right-hand end thereof in Fig. 5.

Fig. 7 shows the five parts of Fig. 1 sub-assembled to complete the "housing-base unit" ready to be inserted in a "housing-cover unit" assembly (Figs. 9 and 10) later described. And the near end is also broken away in Fig. 7 to show the assembly arrangement.

Fig. 8 is a bottom view of the "housing-base unit," that is, a bottom view of Fig. 7.

Fig. 9 shows a housing-cover with its switch-contact parts placed in spaced alignment for assembly.

Fig. 10 shows a complete sub-assembly of the "housing-cover unit," that is, the loose parts of Fig. 9 are in final position; and a temperature-adjusting screw (shown broken off) is also mounted in the housing-cover.

Fig. 11 shows a longitudinal section of a completely assembled switch in normal position, that is, the temperature of its active or control member (the monobar) is normal or at room temperature, and hence the switch-contact points are closed for transmission of current.

Fig. 12 shows a transverse section on the line 12—12; and Fig. 13 is a like section on the line 13—13.

Fig. 14 is a position or an action-view based upon Fig. 11, being a similar section, but the thermal-responsive monobar has attained a temperature above the normal range for which the switch is adjustably set. Consequently, the contact points have automatically separated in order to open a circuit and stop the flow of current through the switch. This view also shows the switch installed on the flat surface of an electrically-heated appliance or other apparatus and having maximum thermal-contact therewith.

New thermostatic mechanism and housing-base unit

In referring further to the drawings for a detailed description of an illustrated example of the invention, the perspective views (Fig. 1) are noted. First, we will explain a housing-base which constitutes the lower portion of the thermostatic switch and encloses the thermal-responsive operating parts thereof comprising the more important part of the invention.

One form of the housing base suited to manufacture is indicated generally at 3 which also points to its two parallel sides 3 folded up from a flat bottom 4 which is slotted lengthwise at 5. The housing base 3 is shown as an integral box-like member of rectangular and elongated shape; its two upright parallel straight sides 3 and flat bottom 4 being of equal length. The height of the two side portions 3 may well be less than the width of the integral flat bottom portion 4.

The elongated slot 5 is made narrower than the bottom 4 and may be shorter than said bottom. Thus the long narrow slotted opening 5 has its ends 6 terminating inside the extremities of the bottom 4 in the present form of construction. Each extremity of the flat bottom 4, just beyond the slot ends 6, carries an upturned front-closing end wall portion 7 and a rear-closing end wall 8, both of which are integral with the box-like member 3. The two ends 7 and 8 also may be parallel and somewhat higher than the sides 3.

A screw-threaded hole 9 is provided in each closed-end portion 7 and 8, for final-assembly purposes, as later described. Also, the bottom 4 is perforated or holed through, at its front end, as seen at 10. In addition, two axially-aligned bearing apertures are provided at 12 in the two vertical sides 3, near the rear end of the housing-base, and are located somewhat above its flat bottom 4, where the two sides 3 are widened to accommodate said two bearing apertures. Finally, a rectangular aperture 13 is provided in the lower central portion of the rear end 8 of the housing-base in vertical alignment with the slot 5 but in a horizontal plane adjacent and above said slot. These several openings are for assembly of the other four parts of Fig. 1 into this housing-base 3, as hereinafter described.

According to the foregoing, it is seen that the box-like housing-base 3 constitutes a frame-like open-top housing of channel-like formation, a flat and straight bottom 4 having a slotted opening 5 therethrough, and with closed ends 7 and 8, the whole constituting a simple one-piece member. The simple design and straight lines of this type of housing-base expedite production and assembly; it is readily die-pressed and formed-up from sheet metal (steel or sheet iron) in machine operations to produce a sturdy one-piece housing-base of integral formation. Other types thereof which we initially designed and constructed also are suitable, but the housing-base 3 here illustrated appears to be well suited in connection with explaining the principles of the invention.

The next part referred to comprises an elongated unimetal or monobar 14 having four-straight parallel sides, being rectangular in cross section, and constituting the thermal-responsive element or active-control part (Fig. 3) of the new switch. It is the appreciable straight-line motion of this monobar 14, when contracting and expanding linearly during temperature variations, which is transmitted to switch-contact means (later described) for opening and closing an electrical circuit. And it is observed that the thermostatic bar 14 comprises a single piece of brass or aluminum or other metal having a coefficient of expansion greater than the housing-base 3 of iron in which said monobar 14 is operatively mounted, as later described.

The width of the monobar 14 approximates or may be slightly less than the width of the slot 5 in the bottom 4 and slightly thicker than said bottom. In length, it approximates that of the bottom 4 and has a straight and flat plane lower surface or face, indicated generally at 15, from end to end thereof. As later explained, such plane or flat bottom face 15 affords a continuously-engaging surface-area thermal-contact with a similarly plane surface of any heating member on which the thermostatic switch is installed (as in Fig. 14) for controlling the temperature thereof.

The monobar 14 has its front end under-surface notched upwardly at 16, and its rear end likewise is notched at 17. The depth of these two underneath notches 16 and 17 is shown (in the present example of the invention) as being equal to the thickness of the flat bottom 4 of the housing-base 3. The cross-sectional area of the reduced rear extremity 17 of the monobar is dimension-formed for a comparatively close although a free entry and for relative creeping motion (expansion and contraction) within the aperture 13 of the rear-end wall 8 of the housing-base 3.

A rivet hole 18 may be provided at the forward end of the thermal-responsive monobar 14 through its thin or notched-end section 16. An abutment in the form of a boss or head 19 is raised on the rear notched end 17 of the bar 14, on its upper surface, and slightly forward of the underneath notch. Thus the rivet hole 18 and abutment head 19 have maximum spacing on the bar.

Next, we refer to and explain an operating lever (Fig. 2) which picks up, multiplies and transmits the appreciable motion, resulting from the linear contraction and expansion of the long monobar 14, to the switch-contact points (later described). Such a lever is indicated generally at 21 pointing to its web or flat straight forward portion having integral tapering and parallel side flanges 22 folded upward therefrom. This construction provides a channel-like lever which in length may well be one-half, more or less, the length of the long monobar 14. The width of the lever web 21 (between the outer surfaces of its upright parallel side flanges 22) is such as to provide a pivotal or swinging fit within and between the upright parallel sides 3 of the housing-base.

The front end of the lever 21 is fitted with an insulating button 23 usually made of ceramic material carried in an aperture or otherwise secured thereto. Next, two bearing apertures 24 are formed in axial alignment through the rear ends of the two upturned tapering parallel side flanges 22 (where the latter are widened to a round formation to accommodate said bearing apertures 24) for use in operatively mounting the lever 21 within the housing-base 3. The rear end of the flat-web portion 21 (the long arm of the lever) terminates with a rear-end lever bearing edge 25 extending transversely between the two integral parallel side flanges 22 and in the plane of said flat-web portion.

The rear-end bearing edge 25 is located below the two bearing apertures 24, parallel with the axis of the latter, and is a straight edge in this example of the invention. Furthermore, the short distance measured between the axis of the bearing apertures 24 and rear-end bearing edge 25 is or may be of the order of about one-sixth (⅙) of the right-angle longer length of the lever 21 measured between its insulating button 23 and said rear-end edge 25. By reason of this differential length relation of the two arms of the lever (about one to six), it follows that said lever (Fig. 2) constitutes a bell crank motion amplifier having a forward-reaching arm 21 which is considerably longer and which travels faster through a greater distance than the short angle-arm formed by the two spaced side flanges 22 as measured between the rear-end edge 25 and the axis of the bearing apertures 24.

A rocker shaft 26 (Fig. 2) is mounted in the bearing apertures 24 of the bell crank flanges 22, and the ends of said shaft are adapted to be mounted in the bearing apertures 12 of the housing-base 3. In length, the shaft 26 is shown equal to the distance between the outer parallel surfaces of the two spaced sides 3 of the housing-base. Thus the shaft ends will be and are flush with the outer surfaces of the sides 3 of the housing-base, as shown (Figs. 7 and 13).

Note also (Fig. 3) that a rivet 27 is illustrated as the fifth part for use in connection with the development of the monobar and housing-base unit sub-assembly (Fig. 7), next considered.

To assemble the parts (as in Figs. 7 and 8), the long brass monobar 14 is mounted in the long slot 5 of the steel housing bottom 4, with the notched rear end 17 inserted in the aperture 13 of the housing-base rear end 8 for a freely-creeping motion therein, and with the two holes 10 and 18 in alignment. The rivet 27 then is inserted through the two aligned holes and peened over with a countersunk flush finish on the underneath surface of the flat bottom 4. This arrangement anchors the front end 16 of the bar 14 to the bottom 4 and leaves the entire length and the rear end 17 of the bar free for its back and forth creeping motion within the aperture 13 and with the outer flat surface 15 of the bar exposed through the slot 5.

Thus it is seen that the monobar 14 has its front end fixed to the housing-base, and its rear free end 17 is confined and guided for linear movement. Of importance is the fact that the foregoing assembly arrangement disposes the flat-bottom surface of the brass monobar 14 and the flat-bottom surface of the steel or iron housing bottom 4 in one and the same plane—hence in flush relation. This structural feature is clearly shown in Figs. 11 through 14, particularly so in Figs. 12 and 13.

In some instances, we may prefer to anchor the front end 16 of the thermal-responsive monobar 14 by "spot-welding" it at the place occupied by the rivet 27. Either method is suitable and the rivet is here illustrated for clarity as one assembly method for operatively mounting the bar 14 within the slot 5 of the housing-base 3, in order to leave the entire length of the bar free for straight-line movement relatively within the slot 5 and aperture 13 in the course of its expansion and contraction due to temperature variations.

Next, the motion-amplifying bell crank lever 21 is placed within the housing-base 3 (Figs. 7 and 8), with the four bearing apertures 12 and 24 in axial alignment and the rocket shaft 26 inserted, as shown and heretofore described, with the two spaced parallel side flanges 22 extending upward, that is, away from the adjacent monobar 14. This permits the long forward button-end 23 of the web-like arm portion 21 to have an up and down free angular motion on the rock shaft 26 within the stationary housing-base 3, and with the rear-end bearing edge 25 at rest against the front side of the head or boss 19 acting as a stop to limit the downward movement of the lever arm. Note also that the adjacently positioned lever arm 21 and monobar 14 are approximately parallel.

It is important to note that the front side of the monobar portion or head 19 engages the end bearing edge 25 of the long web-like arm 21 of the bell crank lever, and that the head 19 is to be regarded as an integral portion of said monobar 14. Incidentally, the method of retaining the shaft 26 in position against axial displacement is later noted. And this completes the assembly of the open-top upright "housing-base unit" shown in Figs. 1 through 8.

*The housing-cover unit*

Next, we will describe the upper unit sub-assembly comprising a support for the switch-contact points and related parts as well as a cover for the foregoing "housing-base unit."

Accordingly, a housing-cover (indicated generally at 29) also is made in the form of a box-like member having a closed flat top 29 which is integral with parallel side walls 30 and parallel end walls 31, such cover being assembled and disposed in an inverted position with its open bottom turned downward. In size, the housing-cover 29 is dimension-formed to make a telescopical-slip fit over and onto the housing-base 3. Of importance is the fact that the inner depth of housing-cover 29 is also precisely dimension-formed to cause it to rest upon and be supported by the two end walls 7 and 8 of the housing-base 3. Note also that this housing-cover 29 is shown with a pair of integral ears 32 carried at its ends which constitute perforated screw-receiving mounting flanges.

The ears 32 are disposed laterally at the lower plane of the inverted open-bottom housing-cover 29 for installing the thermostatic switch in service position on electrically-heated apparatus (Fig. 14), as later described. The housing-cover 29 may be made of sheet metal, such as iron or steel, etc., in the same fashion as the housing-base 3 but does not coact thermally with the housing-base or the thermal-responsive parts of the latter. An unthreaded screw hole 33 is provided through each end wall 31 of the housing-cover. Also, a boss or rib 34 is deformed inwardly into the rear end wall (right-hand end) of the housing-cover to coact with and provide clearance from the housing-base 3 for a purpose later explained.

A manual-adjusting screw 36, having an insulating button on its lower end in the usual way, is carried operatively in the housing-cover 29 to set and regulate an adjustable contact 37 fixed on a resilient or leaf-spring arm 38. The adjusting screw 36 has a knurled upper end (Fig. 11) on which to fix a hand-setting dial knob (not shown) which is usual in thermostatic switches. The spring arm 38 is flexibly adjustable at one end and has a length about one-half or slightly greater than the length of the housing-cover 29 and is disposed longitudinally therein.

It is seen that the manually-adjustable spring arm 38 has one end anchored, as by a screw 39, to the underneath surface of the top wall 29 of the housing-cover. One or more nuts ordinarily are employed for locking the screw 39 in position. Also, insulating strips (usually of mica) are disposed in a conventional manner on the screw 39, between the spring arm 38 and the housing-cover 29, to insulate said housing-cover from the current-carrying parts.

The foregoing arrangement of the adjustable-spring arm 38 leaves its outer end and its adjustable contact 37 flexibly free and in alignment with the axis of the manual-adjusting screw 36. It is noted that the adjustable-spring arm 38 is preformed in bend and shape to simulate its angular form shown (Fig. 9) before it is anchored in flexed and pre-stressed or spring-loaded position (as in Fig. 10). In other words, the spring arm 38 (when relaxed and free of tension) has its forward end free (left-hand end), with its switch contact 37, preformed upward toward the plane of its stationary end held by the screw 39 and, therefore, upward toward the adjusting screw 36.

Accordingly, when the anchoring screw 39 is tightened into final position (Fig. 10), it follows that the spring arm 38 becomes spring-loaded and under tension acting upwardly with a yielding pressure against the insulating button on the lower end of the manual-adjusting screw 36. The tensioned-spring arm 38 at all times bears against and follows the adjusting travel of the screw 36 when the latter is screwed inward and outward for setting the position of the switch contact 37 to a preselected degree of temperature in a manner known to the art.

Next, it is seen that an automatically controlled contact 41 is carried on the free-flexing end of a leaf-spring arm 42 of a length somewhat greater than the manually-adjusted spring arm 38. This second spring arm 42 approaches the length of the housing-cover 29 and is mounted in underneath spaced alignment with the first spring arm 38. A screw 43 anchors the right-hand end of the spring arm 42 to the cover wall 29 in the same manner as before described in connection with the first anchorage screw 39. The lower long-spring arm 42 also is preformed to set its contact 41 in a downward position (separated from the upper adjustable contact 37) when the screw 43 and its nut are tightened to final position. Accordingly, when sub-assembled (Fig. 10), the lower spring arm 42 stands downward at an angle and without tension, while the upper arm 38 presses with tension against the lower end of the adjusting screw 36.

As understood in the art, insulating sheets are placed in position to isolate the cover housing 29 and insulate it from the current-carrying screw 43 and its spring arm 42. It is usual to provide a pair of mica sheets, one on the upper and one on the lower surface of the cover wall 29, for both of the arm-securing screws 39 and 43. Furthermore, the upper ends of these two screws are shown sufficiently long for receiving wire connections (not illustrated) of an electrical circuit adapted to be controlled by the switch which thus is connected in series with such circuit.

*Final assembly and operation*

Having completed the foregoing two sub-assemblies (the housing-base unit, Figs. 1 through 8, and the housing-cover unit, Figs. 9 and 10), the simplicity of the final assembly (Sheet 3) and the operation of this new thermostatic switch are next described.

The two completed box-like or channel-like housing units (Figs. 7 and 10) are telescopically fitted together, the open-top housing base 3 being slipped into the open-bottom housing cover 29, as shown (Fig. 11). As these two sub-assembled units come together, the insulating button 23 of the bell crank lever 21 engages the under side of the downward extending relaxed (free of tension) spring arm 42 and deflects its outer free end upward into switch-closed (Fig. 11) position, where the two switch contacts 37 and 41 thusly now are engaged and hence immediately placed in current-transmitting engagement by reason of having assembled the two units.

Furthermore, the foregoing assembly operation acts to spring-load, that is, impart tension to the spring arm 42, the reaction of which is in a direction (as downward) to urge it away from the adjustable contact 37 into continuous engagement with the insulating button 23 of the long lever arm 21 and to force the latter away (downward) from said adjustable contact 37. In this manner, the downward reaction of the spring arm 42 maintains the rear-end edge 25 of the short lever arm contiguously with the front side of the monobar boss or abutment portion 19 throughout the temperature range of action of the thermostatic switch. The operating relation of the short-arm lever-edge 25 with the abutment 19 is an important feature of the invention.

Another result of making the foregoing final assembly is noted in reference to the rock shaft 26. When the two housing units are placed together (Fig. 11), it follows that the flush ends of the shaft 26 (as carried in the spaced side flanges of the bell crank lever 21, 22) are engaged and enclosed by the side walls 30 of the housing-cover. This arrangement confines the shaft 26 in operative position without requiring special means for holding it in the switch housing.

Note also that the leaf spring arm 42 extends alongside and in the general direction of the long arm of the web-like lever 21. Compactness and reduction in overall size is thus achieved by mounting the spring arm 42 adjacent to and between the planes of the spaced side flanges 22 without interference with the relative motion of these two switch parts.

To further explain the importance of the unique bell crank lever means, it is pointed out that the two upright spaced short arms (flanges) 22 pivotally balance and characteristically suspend the front end (insulating button) 23 of the long arm under and against the downwardly tensioned or sprung contact member 42 and also the rear-end edge 25 of said long arm web against the creeping abutment free of the bar 14. Thus, the free end 19 of the bar is disposed closely to or between the planes of the two short lever arms 22, and the creeping movement of said bar is active or effective at and with the rear-end edge 25 of the long lever arm and in the plane of its straight web 21. Thus, the operating forces for actuating the switch are received and transmitted at and through the engaging ends 23 and 25 of the long arm. This new combination provides a mode of operation unique in the art and makes for a closely grouped, minimum space, parallel assembly of the long lever arm engagingly interposed under pressure between the tension operated contact member 42 and the abutment end on the thermally operated bar 14.

Inasmuch as the assembly work is performed at normal or room temperature, it follows that the thermal-responsive monobar 14, 19 is also at normal temperature, and hence it is shortened or shrunk to its minimum-normal length. Therefore, the longer end 21 of the bell crank lever is in its uppermost position (Fig. 11) due to the fact that the monobar abutment head-end portion 19 (which is in constant engagement with the rear-end edge 25) has crept forwardly toward the anchored end (the rivet 27) of the monobar 14.

In placing the two sub-housing assemblies together (Fig. 11), the two screw-threaded holes 9 of the housing-base 3 now line up in registry with the two unthreaded or loose screw-receiving holes 33 of the housing-cover 29, whereupon a housing screw 45 is inserted at each end (Figs. 11 and 14) and are tightened to anchor the two housing units in their finally assembled position to complete the construction of the switch.

The rib or boss 34, formed in one end 31 (the rear) of the housing-cover 29, affords clearance at the rectangular opening 13 of the housing-base end 8. This clearance is adjacent the freely-creeping end 17 of the monobar 14 and consequently provides adequate space for said end to expand and project elongatingly through the end wall 8 (see Fig. 14) in the event that the thermostatic switch is subject to high temperatures and the bar 14 becomes excessively elongated.

When the switch is in service and the monobar 14 becomes heated, it elongates proportionately throughout its length, and its rear-free (unanchored) end 17 grows and creeps within or through the guiding and retaining aperture 13 (Fig. 11). This elongating action moves the monobar head 19 rearwardly in a direction tending away from the bell crank lever rear-end edge 25 and thereby diminishes the lift on the lever 21. As the monobar head portion 19 tends to retract from the lever edge 25 (due to the rising temperature elongation of the monobar 14), it follows that the reaction of the tensioned contact-spring arm 42 urges the latter to follow against the lever-insulating button 23, thus maintaining the lever edge 25 against the front side of the monobar head 19, and also moving the automatically-controlled contact 41 down away from (or in a direction from) the adjustable contact 37.

Such action in time breaks the electrical circuit through the two current-conducting screws 39 and 43 as well as the two spring-arm contact-means 38 and 42. Thus it follows that any heating apparatus being controlled by the thermostatic switch gradually reduces in temperature. Such apparatus continues to cool until the contracting or shortening action of the monobar 14, 19 (also reducing in temperature) again forces the lever 21 upwardly or away from the monobar and reengages the switch contacts 37 and 41 (which are tensioned in opposite directions away from each other for separating movement) to again close the electrical circuit and transmit current to any heating apparatus the temperature of which is being controlled by the switch.

As is known in the art, turning the manual-adjusting screw 36 downward, to flex and set the spring-loaded spring arm 38 and its adjustable contact 37 closer to the automatic contact 41, causes the switch to open and also to close its electrical circuit at a higher temperature than when the adjusting screw 36 is screwed outward to induce or permit the adjustable contact 37 to lift high above or further away from the automatic contact 41. The latter or greater spaced distance of the adjustable contact 37 requires correspondingly less elongation of the monobar 14, 19 and thus a lower temperature to be absorbed by it in order to open the switch contacts 37 and 41.

The service or installed position of this new thermostatic switch is shown (Fig. 14) where a pair of installation screws 46 secure the electric switch to a flat base B which diagrammatically represents the sole plate of an electrical sadiron or any other heating apparatus adapted to have its temperature automatically controlled. Inasmuch as the lower surface of the two ears 32 are in a plane above the lower face 15 of the monobar 14 (and since the housing-cover 29 seats on the upper edges of the housing-base ends 7 and 8), it follows that clearance is provided between the two ears 32 and the heating base of the apparatus B on which the switch is mounted in service position.

Accordingly, by tightening down the two installation screws 46, the housing-cover 29 acts downward on the housing-base ends 7 and 8 to seat and press the lower surface 15 (Figs. 3 and 14) of the monobar 14 against the heating base B with high thermal conductivity, thereby providing an effective and fast heat-exchanging function between this thermostatic switch and any apparatus which it controls.

Thus, the lower face 15 of the monobar 14, 19 is either flush with or may be disposed slightly below the underneath surface of the housing-base bottom 4. This relation exposes the outer face 15 of the monobar 14 through the slot 5 (Figs. 12 and 13) of the housing-base to establish intimate surface-area temperature-exchange solid contact with the heating apparatus B, the temperature of which is adapted to be controlled by the automatic switch. This surface-area and solid contact is maintained at all times throughout the length of the monobar 14 inasmuch as it is not susceptible to a bowing or flexing action as in the case of "bimetal" thermostats.

It is also important to observe the new results attained by the cooperating rectangular aperture 13 and the rear end 17 of the monobar. The aperture 13 not only retains the monobar 14 in its operative position during its temperature elongating and shortening creeping action but moreover holds the monobar so that its outer plane surface 15 may not recede into the housing-base 3 under the force of the two installation screws 46 which press the monobar into intimate thermal contact with the heating base B.

The disclosure herein explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful thermostatic electrical switch. Since various modifications in construction, mode of operation, use and method, may and often do occur to others, especially so after acquaintance with an invention, it is to be understood that this disclosure is exemplary of the principles and of equivalent constructions, without being limited to the present showing of the invention.

What is claimed is:

1. A thermostatic switch comprising a housing enclosing electrical contact members, at least one of which is spring tensioned away from the other contact member; a bell crank lever consisting of a long arm formed of a web and spaced apart side flanges, said flanges providing two spaced short parallel arms on the rear end of the web, said web terminating with a rear-end edge in the plane thereof, said rear-end edge being formed transversely of the long arm and between the spaced short arms; an elongated bar means carried by the housing, an abutment on the end of the elongated bar means positioned between the planes of the spaced short arms and being free for relative creeping movement; and a shaft mounted in the housing, above and parallel with the rear-end edge, on which the spaced short arms are pivotally supported, thereby operatively suspending the long arm under and with its front end against the spring tensioned contact member, and with its rear-end edge against said abutment by which said relative creeping movement is effective on the long arm in the plane of its web to actuate the switch.

2. A thermostatic switch comprising, in combination, a housing, electrical contacts operatively mounted in the housing under tension which urges them apart, an elongated thermally-responsive monobar having one end anchored in the housing and the other end left free for relative creeping linear movement, a motion-amplifying lever adjacent the monobar and having a long web-like arm portion with parallel side flanges, one end of which long arm engages one of said tensioned contacts and normally holds it against the other contact in switch-closed position, the other end of said long arm terminating with an end bearing edge in the plane of the long web-like arm portion, said end bearing edge being disposed transversely of and between the parallel side flanges and in engagement with a head on the free end of said monobar under the urge of said tensioned contact engaging the long arm, the parallel side flanges extending away from the monobar and forming a short lever arm; and a rock shaft extending through the parallel side flanges of the short lever arm, in parallel relation with the end bearing edge, with said shaft ends mounted in the housing.

3. A thermostatic switch as described in claim 2, and having additional features, comprising a leaf-spring arm having one end anchored within the housing and the other end free and carrying one of the contacts and imparting said tension for movement away from the other contact, the leaf-spring arm being mounted adjacent to and extending in the same direction as the long web-like arm portion and operatively disposed between the planes of the parallel side flanges.

4. A thermostatic switch as described in claim 2, characterized in respect to the housing and the rock shaft, wherein said housing comprises channel-like telescoping parts, the rock shaft being mounted within the inside housing part, and the outside housing part covering the ends of the rock shaft and retaining it in mounted position.

5. A thermostatic switch as described in claim 2, but wherein the housing is of elongated form, and is provided with a long narrow slot, and the monobar is exposed through the slot which adapts its exposed surface to direct surface-area solid-contact with the surface of any heated member on which the switch is mounted.

6. A thermostatic switch comprising an elongated housing provided with a slot formed lengthwise therein, an adjustable contact mounted in the housing, a tensioned contact also mounted in the housing and being urged in a direction to move away from the adjustable contact, an elongated thermally-responsive monobar mounted within the slot and having a flat heat-exchange surface exposed through said slot; one end of the monobar being anchored in the housing, and the other end of said monobar being free for relative creeping movement therein; a motion-amplifying lever having a long arm extending forward in the housing, bearing against the tensioned contact, and normally holding the latter against its tension in switch-closed position engaging the adjustable contact, the lever also having spaced apart short arms, the lever also including a bearing edge disposed transversely of and having operative engagement with the free end of the monobar under the urge of the tensioned contact, spaced flanges formed on the lever and reaching rearward to the bearing edge and thus providing said short arm; and a shaft extending through the spaced short arms, parallel with the bearing edge, and being mounted in the housing for pivotally supporting the lever therein.

7. A thermostatic switch as described in claim 6, and having additional features, comprising an underneath notch provided in each end of the monobar, the notches being formed in depth substantially equal to the thickness of the housing, thereby disposing the flat surface of the monobar through the slot for surface-area direct engagement with a heated member on which the switch is mounted.

8. A thermostatic switch as described in claim 6, and having additional features, comprising an underneath notch provided in each end of the monobar, the notches being formed in depth substantially equal to the thickness of the housing, thereby disposing the flat surface of the monobar through the slot, one notched end of the monobar being anchored to the housing, and the other notched end of the monobar being operatively confined within an aperture provided in the housing for holding said monobar in its anchored position but free for undergoing its contracting and expanding movement.

9. A thermostatic switch as described in claim 6, and having additional features, comprising an aperture provided at one end of the housing and dimensioned-formed for a movable fit with the monobar, and the free end of said monobar being operatively disposed and guided within the aperture for expansion and contraction therein.

BERNARD ALTMAN.
PAUL STILLER.

REFERENCES CITED

The following references are of record in the file of this patent:

UNITED STATES PATENTS

| Number | Name | Date |
| --- | --- | --- |
| 1,630,359 | Scott | May 31, 1927 |
| 2,084,214 | Pagano | June 15, 1937 |
| 2,210,526 | Burling | Aug. 6, 1940 |

FOREIGN PATENTS

| Number | Country | Date |
| --- | --- | --- |
| 296,122 | Italy | Mar. 9, 1932 |